United States Patent
Bernasch et al.

(10) Patent No.: US 11,179,629 B1
(45) Date of Patent: Nov. 23, 2021

(54) STEERING WHEEL CONTROL DEVICE WITH INTEGRAL LEGS

(71) Applicants: Timothy Frank Bernasch, Toronto (CA); Ahmed Abdullahi Omar, Toronto (CA)

(72) Inventors: Timothy Frank Bernasch, Toronto (CA); Ahmed Abdullahi Omar, Toronto (CA)

( * ) Notice: Subject to any disclaimer, the term of this patent is extended or adjusted under 35 U.S.C. 154(b) by 0 days.

(21) Appl. No.: 16/926,783

(22) Filed: Jul. 13, 2020

(51) Int. Cl.
*A63F 13/245* (2014.01)
*A63F 13/803* (2014.01)

(52) U.S. Cl.
CPC .......... *A63F 13/245* (2014.09); *A63F 13/803* (2014.09)

(58) Field of Classification Search
CPC ................ A63F 13/245; A63F 13/803; A63F 2300/1062
See application file for complete search history.

(56) References Cited

U.S. PATENT DOCUMENTS

| | | | | |
|---|---|---|---|---|
| 1,367,908 A * | 2/1921 | Karschitz | ................. | A47B 3/14 297/35 |
| 2,171,870 A * | 9/1939 | Swartz | ................. | F16M 11/245 248/168 |
| 3,592,429 A * | 7/1971 | Miller | ..................... | F16M 11/10 248/179.1 |
| 4,276,030 A * | 6/1981 | Radice | ..................... | G09B 9/04 434/62 |
| 4,494,754 A * | 1/1985 | Wagner, Jr. | .............. | A63F 13/02 273/148 B |
| 4,630,823 A * | 12/1986 | Grant | ...................... | A63F 13/02 273/148 B |
| 5,207,791 A * | 5/1993 | Scherbarth | .............. | A63F 13/08 273/148 B |
| 5,431,569 A * | 7/1995 | Simpkins | .................. | G09B 9/02 434/29 |
| 5,951,018 A * | 9/1999 | Mamitsu | ................... | G09B 9/02 273/442 |
| 5,989,123 A * | 11/1999 | Tosaki | .................. | A63F 13/803 463/37 |
| 5,992,805 A * | 11/1999 | Tanner | ................... | A47B 19/00 248/125.8 |
| 6,044,772 A * | 4/2000 | Gaudette | ................. | A63F 13/08 108/43 |
| 6,083,106 A * | 7/2000 | McDowell | .............. | A63F 13/02 463/46 |
| 6,119,991 A | 9/2000 | Thorne, III et al. | | |

(Continued)

OTHER PUBLICATIONS

"Rival Gaming Inc.—Tripod Racing Wheel & Pedal In Your Living Room," published Feb. 29, 2020 Source: https://rivalgaming.co (Year: 2020).*

(Continued)

*Primary Examiner* — Steven J Hylinski

(57) ABSTRACT

Embodiments of the present invention provide a device and a method of supporting a game controller such as a steering wheel without mounting it to a structure such as a desk or table. The game controller is instead supported on a number of extendable legs which are integral to the controller. In specific embodiments, a game controller with integral legs comprises a base which includes three telescoping legs which move outwardly to the extended position for providing support on the floor in front on the user's seat.

3 Claims, 6 Drawing Sheets

(56) References Cited

U.S. PATENT DOCUMENTS

| | | | |
|---|---|---|---|
| 6,142,877 A * | 11/2000 | Nishimura | A63F 13/08 463/46 |
| D446,263 S * | 8/2001 | Heys | D21/326 |
| 6,544,124 B2 | 4/2003 | Ireland et al. | |
| 6,663,058 B1 * | 12/2003 | Peterson | A63F 13/02 248/125.9 |
| 6,851,950 B1 * | 2/2005 | Gamnig | G09B 9/08 434/30 |
| 6,976,677 B1 | 12/2005 | McVicar | |
| D527,054 S * | 8/2006 | Brase | D21/326 |
| D544,923 S * | 6/2007 | Brase | D21/326 |
| 7,297,060 B2 * | 11/2007 | Brase | A47C 3/16 463/36 |
| 7,662,042 B2 * | 2/2010 | Oswald | A47C 15/004 463/46 |
| 7,775,884 B1 * | 8/2010 | McCauley | A63F 13/245 463/39 |
| 7,828,157 B2 * | 11/2010 | Thorsen | A63F 13/98 211/26.2 |
| 7,857,311 B2 * | 12/2010 | Minke | A63F 13/98 273/148 R |
| D637,656 S * | 5/2011 | Brault | D21/333 |
| D656,553 S * | 3/2012 | Blaskov | D21/326 |
| 8,251,452 B2 * | 8/2012 | Hill | A63F 13/214 297/380 |
| D670,780 S * | 11/2012 | Cunningham | D21/828 |
| 8,550,915 B2 | 10/2013 | Ashida et al. | |
| D701,917 S * | 4/2014 | Ghahramanian | D21/326 |
| 8,920,240 B2 | 12/2014 | Jaouen | |
| D850,170 S * | 6/2019 | Smith | D6/682 |
| 10,413,815 B2 * | 9/2019 | Ergen | A63F 13/235 |
| D912,733 S * | 3/2021 | Ghahramanian | D21/333 |
| 2003/0067111 A1 | 4/2003 | Swan et al. | |
| 2004/0016588 A1 * | 1/2004 | Vitale | B62D 1/04 180/322 |
| 2005/0009611 A1 * | 1/2005 | Masaya | A63F 13/245 463/46 |
| 2005/0130739 A1 * | 6/2005 | Argentar | A63F 13/245 463/36 |
| 2005/0132939 A1 * | 6/2005 | McClellion | A63F 13/98 108/92 |
| 2007/0238521 A1 * | 10/2007 | Yu | A63F 13/06 463/36 |

OTHER PUBLICATIONS

"Tripod Racing Wheel by Rival Gaming," by Behzad Rashidizadeh. Published Jan. 4, 2021. Source: https://behzadrashidi.com/tripod-race-wheel (Year: 2021).*

"The Tripod Explained," by Todd Vorenkamp. Published Feb. 7, 2017. Source: https://www.bhphotovideo.com/explora/photography/buying-guide/the-tripod-explained (Year: 2017).*

* cited by examiner

STEERING WHEEL CONTROL DEVICE WITH INTEGRAL LEGS

CROSS REFERENCE TO RELATED APPLICATIONS

None.

FEDERALLY SPONSORED RESEARCH

None.

SEQUENCE LISTING

None.

FIELD OF THE INVENTION

This invention relates to video game controllers and specifically to ones shaped like steering wheels used for vehicle simulation video games.

BACKGROUND

Many garners wish to use a steering wheel to control vehicles in their video games. This increases the level of immersion in the game by simulating the way vehicles are controlled in the real world. It also offers an increased level of control vs. an analog joystick since it has a much greater range of motion. Since the gaming boom of the 1980's many steering wheel controller designs have been introduced. Manufacturing a controller in the shape of a standard steering wheel is simple, however physically mounting the wheel in a way that is easy for the average home user has been a problem for as long as steering wheel controller designs have existed. In fact, the need to solidly mount the steering wheel to something, has been the major driver of different designs of steering wheel controllers.

Most designs of the past have been designed to sit on a table top surface, for example <U.S. Pat. No. 8,920,240B2>. This design works if there is a table of the correct height available, but could involve moving furniture or in the worst case purchasing new furniture, which is not ideal Various table top mounting strategies like suction cups, rubber feet, and clamps have been commonly used.

Some designs like <US Pat. No. US20030067111A1> have also been designed to sit on a user's own lap. This is not particularly stable or ergonomic. It also limits how force-feedback motors can be used since the torque generated on the wheel can lift the base into the air while also transmitting all of that force into the user's legs.

With the recent popularity of accelerometer-based controllers, some console games now support holding up the controller in the air and rotating it with no physical connection to any base. In some cases, plastic shells are available to make the controller Into the shape of a wheel <U.S. Pat. No. 8,550,915 B2>. This is more of a compromise than a perfect solution, since it lacks any rotational feedback (relying on vibrational feedback only) and also the button layout of a controller shell system is not the same as it is on "professional" purpose-built wheels which are made to simulate vehicles accurately.

To illustrate what an issue mounting has been, there are even examples of purpose-built pieces of furniture that can have steering wheel kits mounted onto them. These are meant for people who have no suitable furniture for mounting their professional steering wheel. Sometimes this special mounting furniture is more expensive than the controller that mounts to it, making the complete video game controller assembly many times more expensive that it needs to be.

SUMMARY

Embodiments of the present invention provide a device and a method of supporting a game controller such as a steering wheel without mounting it to furniture such as a desk or a table. An improved game controller has integrated telescoping legs and a means to be disassembled into subunits for storage and transport. The base portion is designed to stand on the floor with no additional support requirements.

Accordingly several advantages are to provide a stable platform for a steering wheel video game controller which is inexpensive, lightweight, and able to be stored in a small space.

DESCRIPTION

Figure 1:
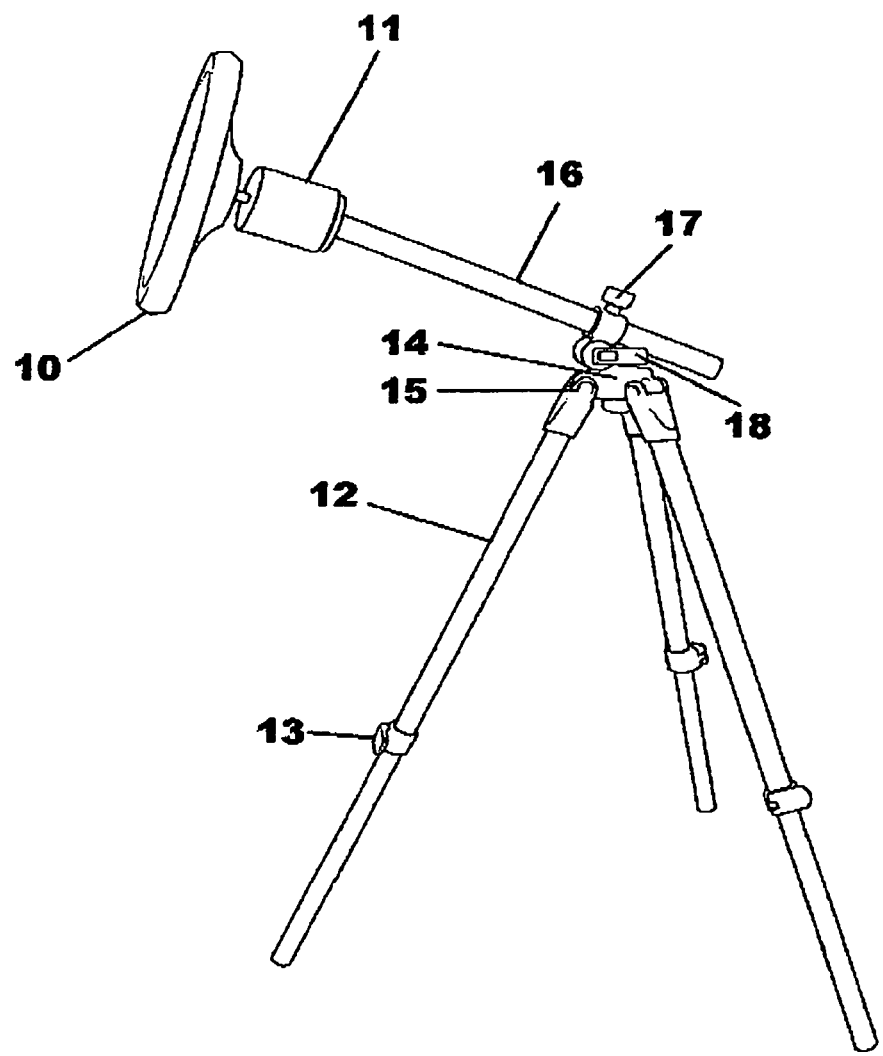
FIG. 1—Is a steering wheel controller with Integral legs in the operating position FIG. 2—Is a detail drawing of the steering wheel front, showing one possible embodiment of buttons on the front face FIG. 3—Is a side-view of how the steering wheel controller would be positioned relative to a human sitting in a seat

FIG. 1 shows one possible embodiment of a complete steering wheel controller assembly with integral legs. The steering wheel (10) is attached mechanically to a drive assembly (11) which In some embodiments may be a brushless DC motor (BLOC) with a gear ratio reduction. The steering wheel and drive assembly may be attached together with a quick-release clamping mechanism to allow it to be disassembled. In an embodiment the drive assembly also may be detached from the base portion by means of a hand screw.

Legs (12) are symmetrically fixed to a center node (14) and able to pivot radially about this attachment point on hinges (15). In some embodiments, the legs (12) can telescope in order to change the height of the steering wheel (10), or to stow the controller for storage. The desired adjustment is fixed via clamps (13). The steering column (16) portion which is attached to the drive assembly (11) on one end is fixed to the center node (14) on the other hand. The steering column is adjustable in length by means of a clamp (17) and also the vertical angle can be adjusted by means of another clamp (18).

Figure 2:
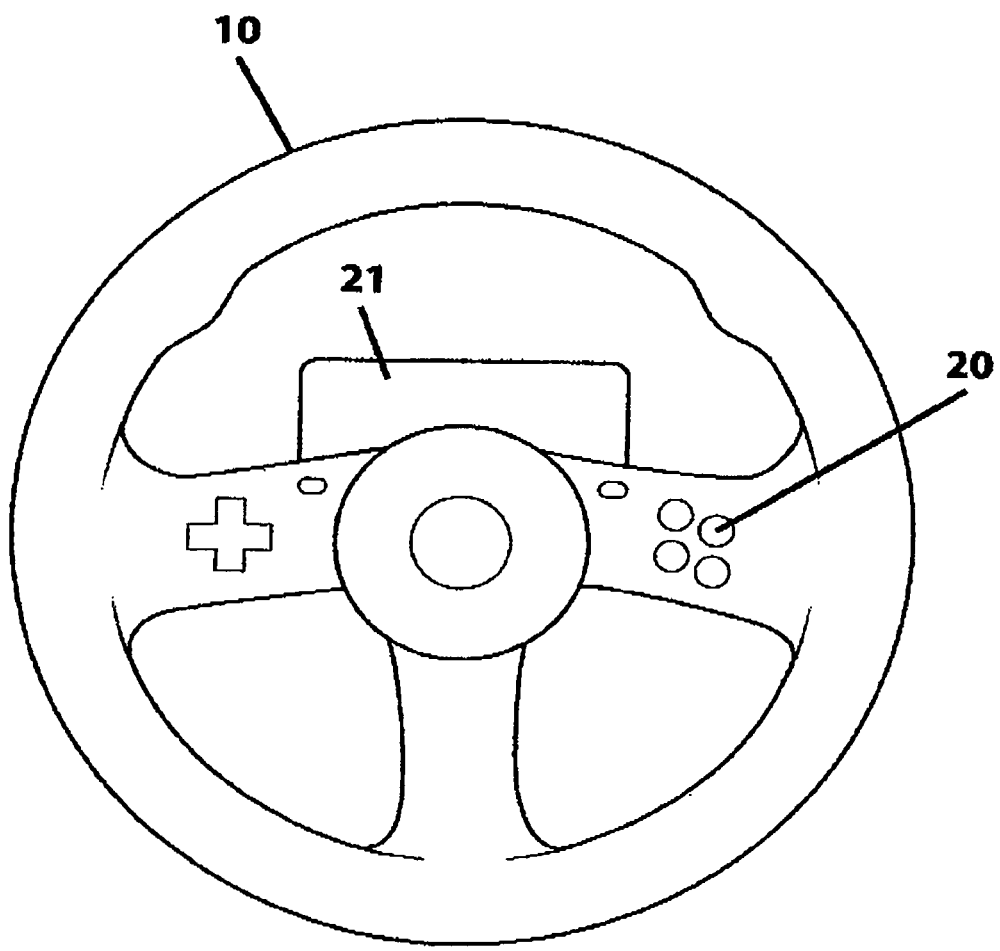

FIG. 2 shows a front view of one embodiment of a steering wheel (10). A number of buttons (20) are located on the front and/or back of the steering wheel in order to control functions of the video game other than steering. Some of the buttons may control functions of the game controller itself such as force feedback intensity. A display (21) may be used to provide information about the configuration of the steering wheel controller, such as force feedback intensity.

Figure 3:
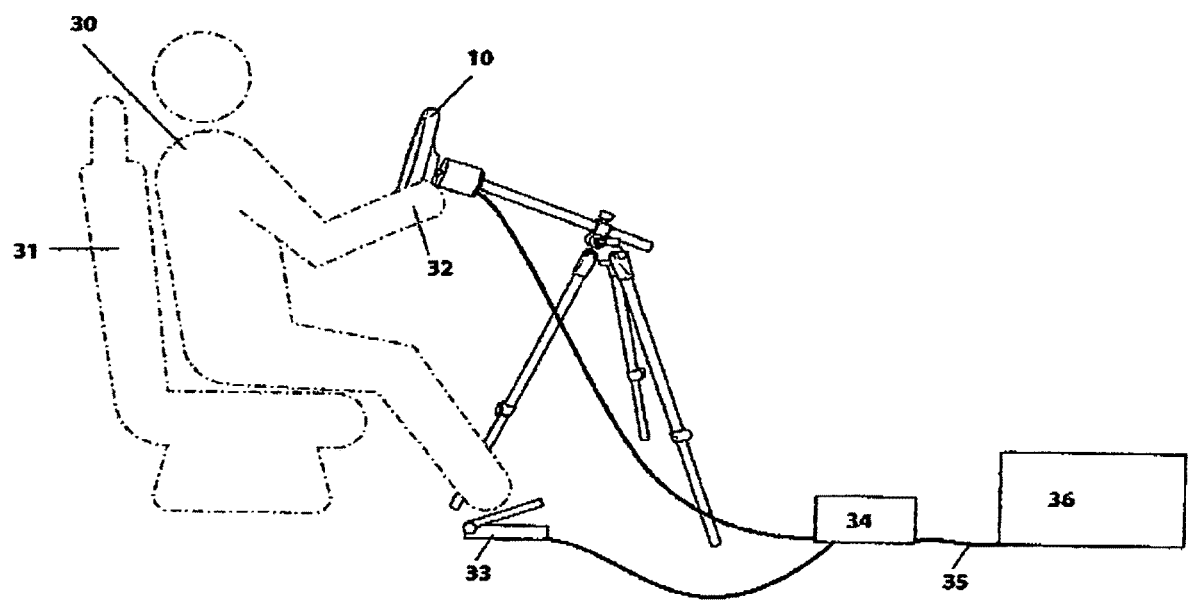

FIG. 3 shows a side view of the steering wheel (10) being held by a user (30) with their hands (32) while sitting in a seat (31). The steering wheel drive unit (11) is controlled by an electronic control circuit (34) which has a means to convert the physical angle of the steering wheel into commands which are sent on to a gaming device (36) over a connection such a physical wire or wireless radio (35). In some embodiments there is also means to send force-feedback information from the gaming console to the drive unit. The electronic control circuit (34) may be positioned anywhere relative to the drive unit (11). In one embodiment it is bolted to the side of the drive unit. Pedals (33) to may also be attached to the control circuitry to simulate the pedals within a vehicle.

Figure 4A:
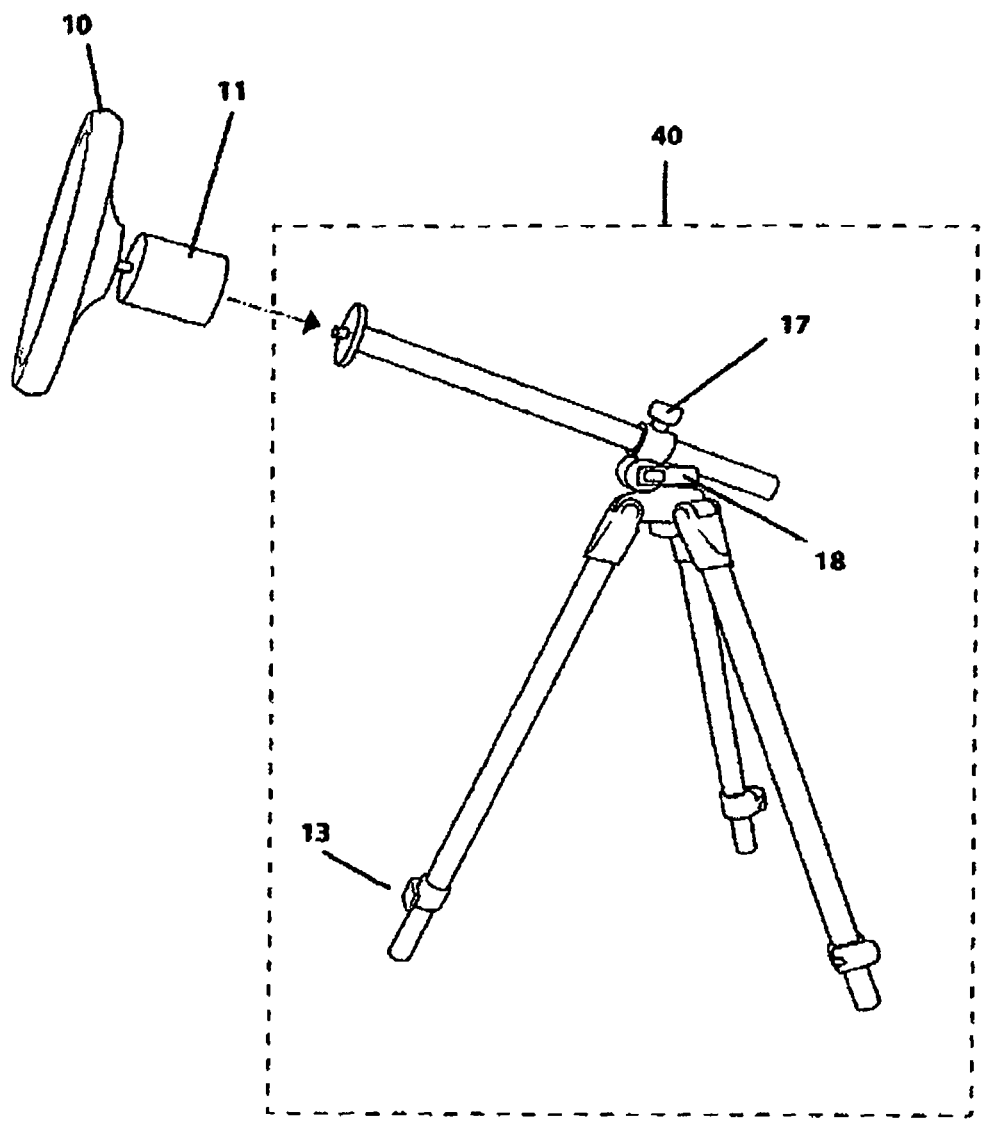
FIG. 4A, FIG. 4B, and FIG. 4C show how the base can be stowed in a compact form FIG. 4A—Shows how the wheel portion can be removed from the base portion, and shows the telescoping legs in a stowed position FIG. 4B—Shows the base components in the operational position, as well as the stowed position (dotted lines) but without the legs being folded FIG. 4C—Shows the fully stowed configuration, including the legs being folded

FIG. 4A shows how the drive assembly is a separate unit which can be locked onto the base portion or removed for storage. It also shows the legs in the stowed position.

Figure 4B:
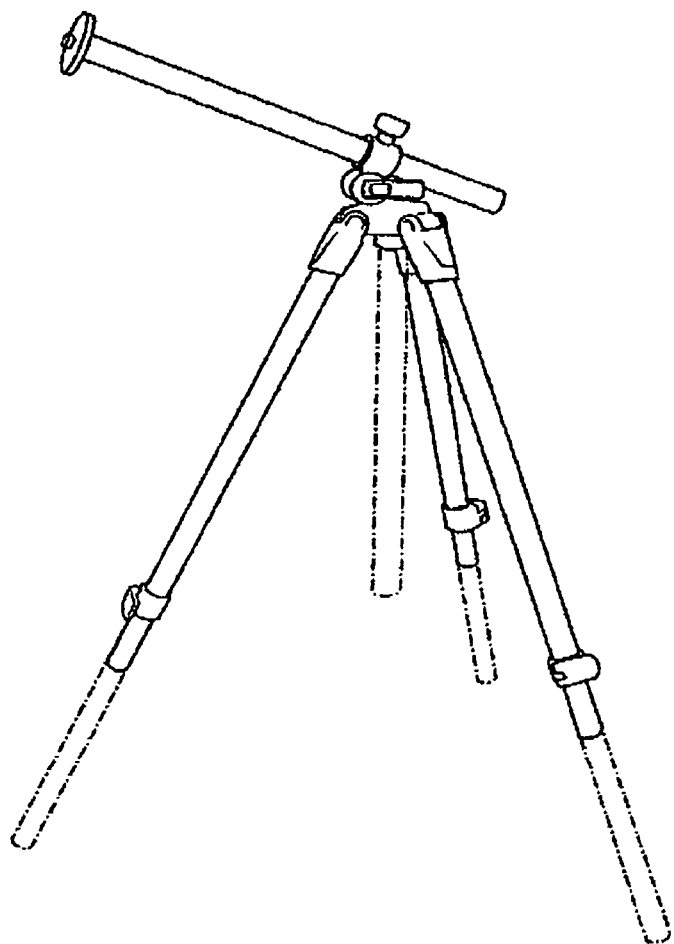
Figure 4C:
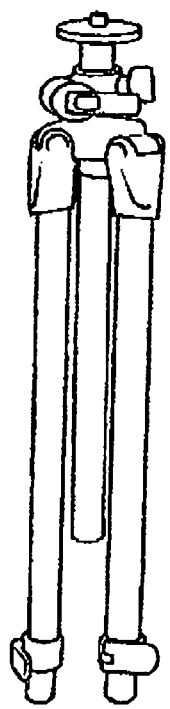

FIG. 4B shows the base components in the operational position, as well as the stowed position (dotted lines) but without the legs being folded FIG. 4C shows the fully stowed configuration, including the legs being folded.

In order to provide even greater stability, if required, a weight may be added to the base subunit (40). In some embodiments this could be a bottle of water or lag of sand that attaches to the center node (14), however it could be any material that is heavy and it may attach anywhere.

In accordance an aspect of the invention, a method of supporting a game controller comprises attaching a stable base which is comprised of a center attachment node (14) with legs (12)

In some embodiments, said method further comprises providing integrated legs attached to a central node which can be telescoped and/or folded in order to save space when not in use.

The method further comprises the ability to add an additional weight to the base portion to provide even greater stability if desired. The weight may comprise but is in no way limited to: a bag or bottle of heavy material such as sand, water, iron or lead.

OPERATION

When not in use, the steering wheel controller with integral legs may be stored away in a compact disassembled configuration. FIG. 4B shows the base portion (40) being collapsed, and FIG. 4C shows the packed configuration of the base portion. To operate the steering wheel controller, it is first assembled into the operating configuration. The steering wheel (10) and drive unit (11) are attached via clamps or hand screws to each other and to the base portion. The height and angle is adjusted using the clamps (13, 17, 18), so that the wheel (10) is at a comfortable position for the user. The operating configuration is depicted in FIG. 3.

The electronic control circuit (34) is attached to a gaming device (36) electronically via a wire or wirelessly (35). and communicates electronically with the console, appearing as a controller which can be used to control games, in particular vehicle simulation and racing games. The drive assembly (11) has position feedback which is read by the control circuit (34) and send to the gaming device (36). Force feedback in the form of a rotational force on the steering wheel may be received from the game or it may be generated automatically by the control unit.

The invention claimed is:

1. A video game controller comprising:

A steering wheel which is removably attached to a drive unit capable of generating a torque on the steering wheel, the drive unit itself being attached to a pole or column which is removably attached to a center node with a clamp, and a plurality of legs radiating from said center node which are each attached to said center node with a hinge;

said plurality of legs are adjustable in angle by means of the hinges at the point where said plurality of legs attach to the center attachment node, the legs being able to rotate radially outwards relative to the center attachment node;

a plurality of buttons on the front and back faces of said steering wheel which are a means to control functions of the video game console other than steering, and buttons on the front face of the steering wheel which are a means to control internal functions of said video game controller;

a control circuit which is a means to read wheel position and button information of said steering wheel and transmit it to a video game console, said control circuit is also a means to transmit force feedback from the video game console to said drive unit.

2. A method of supporting a video game controller on the floor by providing an integrated base with legs, comprising:

providing a steering wheel which is removably attached to a drive unit capable of generating a torque on the steering wheel, the drive unit itself being removably attached to a pole or column which is removably attached to a center node, and a plurality of legs radiating from said center node and which are attached to said center node via hinges;

adjusting said plurality of legs in angle by means of clamps at the point where said plurality of legs attach to the center attachment node, the legs being able to rotate radially outwards from their connection to the center attachment node.

3. The method of claim 2, further comprising adjusting said plurality of legs in length using a clamp on each one in order to fix their position to the desired length.

* * * * *